United States Patent [19]

Chen

[11] Patent Number: 5,306,764
[45] Date of Patent: Apr. 26, 1994

[54] WATER DISPERSIBLE POLYURETHANE AND PROCESS FOR PREPARATION THEREOF

[75] Inventor: Der-Shyang Chen, Miaoli Hsien, Taiwan

[73] Assignee: China Technical Consultants Inc., Taipei, Taiwan

[21] Appl. No.: 940,176

[22] Filed: Sep. 3, 1992

[51] Int. Cl.$^5$ .......................... C08J 3/00; C08K 3/20; C08L 75/00; C08G 18/00
[52] U.S. Cl. ........................... 524/591; 525/28; 525/31; 525/452; 525/455; 525/459; 525/460; 525/920; 528/73; 528/75
[58] Field of Search ................... 524/591; 525/28, 31, 525/452, 455, 459, 460, 920; 528/73, 75

[56] References Cited

U.S. PATENT DOCUMENTS

| | | | |
|---|---|---|---|
| 3,876,726 | 4/1975 | Ford, Jr. et al. | 525/28 |
| 4,046,729 | 9/1977 | Scriven et al. | 260/29.2 |
| 4,066,591 | 1/1978 | Scriven et al. | 260/29.2 |
| 4,147,679 | 4/1979 | Scriven et al. | 260/29.2 |
| 4,203,883 | 5/1980 | Hangauer, Jr. | 260/29.2 |
| 4,335,029 | 6/1982 | Dabi et al. | 524/589 |
| 4,948,829 | 8/1990 | Mitsuji et al. | 524/591 |
| 5,087,643 | 2/1992 | Truong | 525/455 |

FOREIGN PATENT DOCUMENTS 2217722A 11/1989 United Kingdom ............... 525/455

*Primary Examiner*—Paul R. Michl
*Assistant Examiner*—P. Niland
*Attorney, Agent, or Firm*—Fish & Richardson

[57] ABSTRACT

Amine-containing, water dispersible polyurethanes made by the following process: (1) in a reactive diluent such as acrylate, methacrylate, acrylonitrile monomer, low viscosity epoxy compound or epoxy resin, or mixture thereof, using an excess amount of polyisocyanate to react with polyol to form NCO-terminated urethane prepolymer; (2) adding hydroxy alkyl acrylate or hydroxy alkyl methacrylate monomer to react with the prepolymer in step (1) to convert its -NCO end group into alkyl acrylate or alkyl methacrylate end group; and (3) using an excess amount of polyamine to react with the alkyl (meth)acrylate-terminated prepolymer in step (2) and the reactive diluent and the residual hydroxy-containing monomer in step (2), if any. The polyurethane can be mixed with a crosslinking agent having multi-epoxy or blocked polyisocyanate functionalities, to prepare a stable aqueous coating composition.

20 Claims, No Drawings

WATER DISPERSIBLE POLYURETHANE AND PROCESS FOR PREPARATION THEREOF

FIELD OF THE INVENTION

The present invention is related to a process for making water dispersible polyurethanes, especially to a solvent-free process for making water dispersible polyurethanes.

BACKGROUND OF THE INVENTION

Traditional polyurethane containing coating compositions employ large quantities of organic solvents. Because they are able to undergo chemical crosslinking at low temperatures and harden fast, and coatings prepared from them possess very good chemical and physical properties, they have long been widely employed in the surface treatment of articles such as fabrics, leathers, flexible PVC sheets, and the like. In recent years, due to the escalated requirements in environmental protection, industrial safety, and employee health, coating resins employing large quantities of organic solvents can no longer satisfy the needs and have gradually become obsolete. Generally accepted substitutes are water dispersible polyurethanes. However, up to date, water dispersible polyurethanes still have many problems in their production methods and the films formed by the latices containing such polymers have not been found to be entirely satisfactory with respect to sufficient hardening, curing or crosslinking under ambient conditions, chemical and physical properties, which prevent them from being widely used.

Many methods of preparing water dispersible polyurethanes are known in the art. They can be generally classified as surfactant-containing and surfactant-free methods. Due to the fact that residual surfactants can hurt coating properties, surfactant-containing methods are seldom used. Surfactant-free methods are more widely employed. A typical surfactant-free method is to first prepare NCO-terminated urethane prepolymer, and then let the prepolymer undergo salt-forming and chain-extending processes and eventually disperse into water. The production processes of surfactant-free methods can be further categorized into organic solvent-containing and organic solvent-free methods.

The organic solvent-containing methods produce resins with a higher molecular weight and better properties. However, after the preparation of aqueous dispersion, organic solvents have to be removed. As a result, the process is of low productivity and requires a long process time. Furthermore, it is often complicated by defoaming difficulties and other problems that have strong effects on productivity and manufacturing costs. There are methods that employ approximately 10–20% by weight of low odor, hydrophilic organic solvents such as N-methyl pyrolidone, NMP, and require no removal after being dispersed into water. However, NMP's low volatility and high hydrophilicity greatly reduce the drying rate of coating films (especially at room temperature or low temperature). Thus, it is suitable for use only in high temperature baking processes. Nevertheless, the use of organic solvent is not favored in environmental consideration. Examples of organic solvent-containing process can be found in U.S. Pat. Nos. 4,046,729, column 14; 4,066,591, column 14; 4,147,679, column 14; 4,203,883, columns 6–7; and 4,335,029, columns 4–5.

There are organic solvent-free methods, such as Melt Dispersion Process, Prepolymer Mixing Process and Ketimine Process. These methods have common limitations of having to operate in at high temperature and high viscosity environments, and have gelation and other unsurmountable difficulties in actual manufacturing. As a result, these methods are seldom employed in industrial manufacturing. Furthermore, polyisocyanates suitable for these methods are limited to aliphatic diisocyanates, which are of low water reactivity and extremely expensive. Diisocyanates of low cost but higher water reactivity such as TDI are not suitable for the methods. As a result, the raw material costs of these methods are in great disadvantage.

Comparing water dispersible polyurethanes prepared by the methods described above with those prepared by traditional, organic solvent-based methods, the former show inferior physical and chemical properties due to their difficulties in undergoing chemical crosslinking reactions. Furthermore, the hydrophilicity of the residual salts also results in inferior properties. If polyurethanes are crosslinked before being dispersed into water, their low meltability and low solubility would result in operational difficulties in manufacturing processes, and it would be difficult to disperse them into water. Even if they were dispersed into water, the storage stability of the aqueous dispersion would be poor. Thus, in order to improve its properties, common practices are to add crosslinking agents into the aqueous dispersion of polyurethanes. Up to now, the majority of crosslinking agents can only undergo crosslinking reaction at high temperatures. and their curing rate is not satisfactory to the high speed requirements common to industrial productions. Although there are crosslinking agents such as polyaziridines and polycarbodiimides that undergo crosslinking at low temperatures, their use is still limited by shortcomings such as low curing rate, low stability, toxicity and poor coating properties.

SUMMARY OF THE INVENTION

The present invention is to provide a solvent-free process for making water dispersible polyurethanes. According to the present invention, there is no need to use organic solvents in the urethane prepolymer forming reaction and in the subsequent chain-extending step. Instead, they are replaced by reactive diluents which reduce the viscosity of the reaction mixture. The entire manufacturing process is conducted under relatively low temperature and low viscosity conditions, and proceeds smoothly throughout. The reactive diluents are converted into part of the resin at the final stage of the process.

In the present invention, the water dispersible polyurethanes are prepared by the following steps:

(1) reacting a polyol with an excess amount of polyisocyanate to produce a NCO-terminated polyurethane prepolymer, in which a reactive diluent is employed to reduce the viscosity of the reaction and to facilitate its progress instead of an organic solvent;

(2) reacting a hydroxy alkyl acrylate or hydroxy alkyl methacrylate monomer with the prepolymer from (1) and converting its —NCO end group into alkyl acrylate or alkyl methacrylate functionality, during this stage the reactive diluent used in (1) do not undergo chemical reactions; and (3) adding a polyamine into the reaction mixture of (2), wherein said polyamine reacts with the prepolymer products, the unreacted reactive diluent, and the residual alkyl (meth)acrylate monomer, if any, to produce amine-containing polyurethane.

Step (3) can be conducted without an organic solvent, or with a small amount of an organic solvent when appropriate.

The amine-containing polyurethane generated in step (3) may be mixed with a stoichiometric amount of an epoxy-containing or blocked isocyanate crosslinking agent, and then dispersed into water to obtain a stable cationic, anionic or non-ionic aqueous dispersion.

The aqueous dispersion can be easily coated on leather, fabric product, flexible vinyl sheet and other plastics, wood, metal or concrete product's surfaces, and can be dried and cured at room temperature within 0.5-12 hours to produce water resistant, solvent resistant and chemical resistant coatings; if the coating is baked at 60° to 110° C., it will cure within 0.5 to 10 minutes, and have very good properties. Due to its rapid curing rate, it is well suited for use in high speed industrial coating production lines.

DETAILED DESCRIPTION OF THE INVENTION

The polyisocyanates which can be used in the present invention as stated above in step (1) are aromatic or aliphatic compounds containing two or more isocyanate functionalities, such as, for example, 4,4'-diphenylmethanediisocyanate; 4,4'-diphenyldimethylmethanediisocyanate; di- and tetra-alkyldiphenylmethanediisocyanates; 4,4'-dibenzylisocyanate; 1,3-phenylenediisocyanate; 1,4-phenylenediisocyanate; tolylenediisocyanate; chlorinated isocyanates; brominated isocyanates; phosphorus-containing isocyanates; butane-1,4-diisocyanate; hexane-1,6-diisocyanate; dicyclohexylmethanediisocyanate; cyclohexane-1,4-diisocyanate; xylylenediisocyanate; lysinediisocyanate; 1-methyl-benzole-2,4,5-triisocyanate; biphenyl-2,4,4'-triisocyanate; and tri-phenylmethanetriisocyanate.

The polyol which is used in the present invention as stated in step (1) can be of polyether type, polyester type, polybutadiene type, polycarbonate type, polyacetal type, polyesteramide type, or polythioether type, which has an average molecular weight of 200-10,000 and an average hydroxy value of 1,000-10. Examples of polyether polyols are homopolymers or copolymers of tetrahydrofuran, ethylene oxide, propylene oxide and butylene oxide. Other polyether polyols, such as condensation products of propoxylated glycols, ethoxylated glycols, ethylene glycols and alkylene oxide, can also be used.

The polyester polyols are condensation products of polyhydroxy compounds and polycarboxylic acid compounds. Examples of polyhydroxy compounds are ethylene glycol, propylene glycol, diethylene glycol, dipropylene glycol, neopentyl glycol, 1,4-butane diol, 1,3-butane diol, hexanediol, glycerol, trimethylopropane and the like. Examples of polycarboxylic acids are adipic acid, butanedioic acid, phthalic anhydride, isophthalic acid, malonic acid and other aliphatic or aromatic compounds containing two or more carboxylic acids.

The polyol in step (1) can be used as polyether polyol alone, polyester polyol alone, or mixture thereof, or can be combined with a common low molecular weight diol or triol which has a hydroxy value of 200 or above, such as ethylene glycol, diethylene glycol, butanediol, hexanediol, glycerol, trimethylopropane and the like.

The reactive diluent used in the present invention to replace organic solvent to reduce reaction mixture viscosity and assure smooth progress of the reaction, is a low viscosity compound, oligomer, polymer, or mixture thereof, that does not react with —NCO functionality but react readily with amine functionality. Examples of the special reactive diluents are unsaturated ethylenic group-containing acrylate monomer, methacrylate monomer, acrylonitrile monomer, and epoxy-containing compound, oligomer, or polymer. Common examples of acrylate monomer and methacrylate monomer are ethyl acrylate, n-butyl acrylate, 2-ethylhexyl acrylate, lauryl acrylate, methyl methacrylate, n-butyl methacrylate, 1,6-hexanediol diacrylate, trimethylopropane triacrylate, and the like. Epoxy-containing compounds, oligomers or polymers are those that contain one or more epoxy functionalities, have an aliphatic, aromatic or cycloaliphatic main chain structure, and can include ether, ester, urethane, urea, isocyanate or amide linkages, such as glycidyl ethers, glycidyl esters and cycloaliphatic epoxides, epoxy compounds such as low viscosity DER-736 and DER-732 (Dow Chemical Co., U.S.A.), or Epon 828 (Shell Chemical Co.). Suitable amount of the reactive diluent used in step (1) is 0–70%, preferably 5–25%, based on the weight of the reaction mixture.

Step (2) of the present invention as mentioned above is to react the hydroxyl-containing alkyl acrylate or alkyl methacrylate monomer or mixture thereof, with the —NCO terminated urethane prepolymer produced in step (1) to generate alkyl (meth)acrylate-terminated urethane prepolymer. The reactive diluents remain unreacted in this step. The reaction of step (2) is carried out under dried air, at a temperature between room temperature and 60° C. for 2-4 hours, until the NCO content is approximately zero. The equivalent ratio of OH/NCO is between 0.5-10.0, preferably between 0.8-1.5. Examples of hydroxyl containing alkyl acrylate and alkyl methacrylate monomers are hydroxyethyl acrylate, hydroxyethyl methacrylate, hydroxypropyl acrylate, pentaerythritol triacrylate and the like.

Step (3) of the present invention as mentioned above is to react the polyamine with the prepolymers of step (2) and the reactive diluent and the residual hydroxy-containing alkyl (meth)acrylate monomer, if any, to produce amine-containing polyurethane. The step (3) can be carried out without organic solvent yet progresses smoothly, or can be carried out with the help of a small amount of low odor, hydrophilic, volatile solvents such as ethanol, isopropanol, methanol and the like. The equivalent ratio of —NH/ethylenic and epoxy functionality of step (3) is between 1.1 to 10, preferably between 1.3 to 2.5. The reaction is to be continued in dried air environment, and at a temperature from 60° to 100° C. for 2 to 4 hours. The polyamines used are those compounds or oligomers containing two or more primary amines or secondary amines, such as polyalkylene polyamines, for example, ethylene diamine, diethylene triamine, triethylene tetramine, dipropylene triamine and the like, or their condensation polymers with other monomers, such as poly(oxyethylene) diamine, poly(oxypropylene) triamine; or others such as isophorone diamine and hydrazine.

The amine-containing polyurethanes prepared by the process described in the present invention, after mixed with stoichiometric amount of crosslinking agents, can be dispersed into water to generate film forming water dispersions. The crosslinking agents used are those compounds, oligomers or polymers that contain two or more epoxy functionalities or blocked isocyanates. The epoxy containing materials can be bisphenol A type epoxy resins, aliphatic epoxy resins, cycloaliphatic resins, novolac epoxy resins, and epoxy resins containing poly(oxyethylene) and poly(oxypropylene) in the main chains, and other epoxy resins. The blocking agents of the blocked isocyanate crosslinking agents can be secondary or tertiary alcohols, hydrocarbon acids such as malonic acid, dialkyl esters, oximes, lactams, phenols, imides, and other common NCO blocking agents.

The amine-containing polyurethane prepared in step (3) can be dispersed into water to generate small particle size water dispersion by the methods disclosed in the U.S. Pat. Nos. 4,046,729; 4,066,591; 4,147,679; 4,203,883 and 4,335,029. Since the methods of the foregoing patents are well known, detailed description thereof are incorporated by reference. For example, the NCO-terminated urethane prepolymer in step (1) may contain water dispersing salt groups which may be anionic or cationic groups. To prepare anionic type aqueous dispersion, the polyol reactant in step (1) should contain carboxylic acid, sulfonic acid, or their salts; or other anion forming groups. Preferably, the polyol used in step (1) is a composition which contains an appropriate amount of a low molecular weight diol or triol having a sulfonate salt, and then anionic aqueous dispersions can be prepared without a neutralization step. The loading is about 0.02-2.0 equivalents of anion forming functionality per 100 g of polyurethane resin, preferably 0.2-1.0.

If the polyol composition contain no carboxylic acid functionality, sulfonic acid functionality, their salts or other anion forming functionalities, then the polyurethanes can be treated with an organic acid such as acetic acid, formic acid, propionic acid, or inorganic acid such as hydrochloric acid, sulfuric acid, phosphoric acid, or alkylating agents such as methyl sulfate, and other neutralizing agents to generate salts, and to produce cationic water dispersion; the loading of the acids is about 0.02-2.0 equivalents, preferably about 0.2-1.0 equivalents, of neutralizing agents per 100 gram of polyurethanes.

To prepare a non-ionic water dispersion, polyethylene glycol having molecular weights between 200-10,000 can be used as the primary component of the polyol composition. The non-ionic aqueous dispersion can be prepared without a neutralization step. The loading of the polyethylene glycol is about 50-100% of the total polyol used.

The aqueous dispersion of polyurethanes as prepared by the present invention can be easily coated on the surfaces of leathers, flexible vinyl sheets, nylon fabrics, non-woven fabrics, various other fabrics, and other plastics, paper products, wood products, metal products and concrete products by a variety of methods. Films with good chemical and physical properties can be quickly produced under either room temperature drying or mild temperature heating conditions. If room temperature drying is employed, articles that can be stacked up without sticking together can be obtained within about 0.5 to 12 hours, and the ultimate film properties will be established in about a week. If drying is conducted under 110° C., then only 0.5 to 10 minutes are needed to obtain articles that can be stacked up without sticking together, and the ultimate film properties will be established within several days in room temperature. Thus, the water dispersible polyurethane resins prepared by the present invention can be used to replace the conventional, organic solvent based polyurethane resins in industrial applications, and can achieve the objectives of high coating operation efficiency and good film properties.

EXAMPLES OF THE INVENTION

The present invention can be illustrated in further details by the following examples. However, it should be noted that the scope of the present invention is not limited to these examples.

EXAMPLE 1

In a 500 ml four neck reaction kettle, added 87 g of polyester diol (OH equivalent weight, 967; Yun-Chun Polymers Co., Taiwan), 16.05 g of 1,4-butanediol, 20 g of polyethylene glycol PEG-400, and 83.25 g of Cardula E-10 glycidyl ester (Shell Chemical Co.). Applied dried nitrogen sweep into the reaction kettle, stirred until the ingredients were well mixed, then added 71.2 g of toluene diisocyanate (TDI), maintained the reaction temperature between 40 to 60° C. After 1 to 2 hours, the NCO content was measured to be 4.2% by weight. Switched to dried air sweep at this time, stirred for 5 to 10 minutes, added 32.6 g of 2-hydroxyethyl acrylate, maintained the reaction temperature between 40°-60° C. until NCO content was reduced to zero (about 2 hours), then added 46.7 g of dipropylene triamine. The temperature should increase to about 70° C. automatically. After about half an hour, heated up the reaction kettle to 90° C., held for about 3 hours, then cooled down. Resins of 100% solid content were obtained. Took 63 g of the resin, mixed it well with 66 g of epoxy resin BP-501 (molecular weight about 1,000; Chang-Chun Plastic Co., Ltd., Taiwan), 12.6 g of epoxy resin BP-188 (molecular weight about 376; Chang-Chun Plastic Co., Ltd.), 12 g of butanone and 8 g of isopropanol, then added 7.8 g of 30% acetic acid aqueous solution, stirred until well mixed. Then added 184 g of deionized water while stirring. A light-blue colored aqueous dispersion having about 40% solid content was obtained. Applied the aqueous dispersion onto a nylon fabric substrate to form a wet film of about 10 μm in thickness. The wet film would dry within 4 hours at room temperature; and would be dried within 2 minutes, if it was baked in 110° C. The dried coated substrates were able to be stacked together without stickiness after cooling. The dried film has very good water and solvent resistance. After wiping with water for 2000 times, the film remained undamaged, and no water spots were left. After wiping with toluene for 1000 times, the film remained undamaged.

EXAMPLE 2

In a 500 ml four neck reaction kettle, added 92.8 g of polyester diol (OH equivalent weight, 967; Yun-Chun Polymers, Co., Taiwan), 17.12 g of 1,4-butanediol, 21.28 g of polyethylene glycol PEG-400, 33.3 g of butyl acrylate, 33.3 g of Cardula E-10 glycidyl ester (Shell Chemical Co.). Applied dried air sweep into the reaction kettle, and stirred until all ingredients were well mixed, then added 76.3 g of toluene diisocyanate (TDI). Maintained the reaction temperature between 40° to 50° C. After about 2 hours, the NCO content was measured to be 4.5 weight %. At this time, added 33.9 g of 2-hydroxyethyl acrylate, continued dried air sweep, maintained the reaction temperature between 50° to 60° C. After about 2 hours, the NCO content was measured to be zero. At this time, added 46 g of dipropylene triamine, the reaction temperature should automatically increase to about 70° C. Maintained at the temperature for about half an hour, then heated up the reaction kettle to 90° C., held for 3 hours, then stopped heating. After cooling, resins with 100% solid content were obtained. Took 66.8 g of the resin, mixed it well with 50 g of epoxy resin BP-501 (Chang-Chun Plastic Co., Ltd., Taiwan), 18.8 g of epoxy resin BP-188 (Chang-Chun Plastic Co., Ltd, Taiwan), 10 g of butanone, 7.2 g of isopropanol, then add 8 g of 30% acetic acid aqueous solution, stirred until well mixed. Then added 184 g of deionized water while stirring continued. A light-blue colored aqueous dispersion having about 40% solid content was obtained. Applied the aqueous dispersion onto a leather substrate to form a wet film of about 25 μm in thickness. The film would dry within 8 hours in room temperature, and was able to be stacked together without stickiness. After about a week in room temperature, the dried film demonstrated very good water resistance, alcohol resistance and solvent resistance. After wiping with water and alcohol for 2000 times, the film remained undamaged, and were left no water spots or any other marks. After wiping with toluene for about 1000 times, the film remained undamaged.

EXAMPLE 3

In a 500 ml four neck reaction kettle, added 87 g of polyester diol (OH equivalent weight, 967; Yun-Chun Polymers Co., Taiwan), 16.05 g of 1,4-butanediol, 20 g of polyethylene glycol PEG-400, 26.1 g of Cardula E-10 glycidyl ester (Shell Chemical Co.). Applied dried air sweep into the reaction kettle, and stirred until all ingredients were well mixed, then added 90.9 g of isophorone diisocyanate (IPDI). After carrying out the reaction at a temperature between 50° to 70° C. for about 3 hours, the NCO content was measured to be 4.7% by weight. Continued the dried air sweep and added 32.9 g of 2-hydroxyethyl acrylate, maintained the reaction temperature between 40° to 60° C. After about 3 hours, the NCO content was measured to be zero. At this time, added 24.7 g of diethylene triamine, the temperature should automatically increase to about 70° C. After maintaining at the temperature for about half an hour, increased the reaction temperature to 90° C., held for 3 hours then stopped heating. After cooling, resins of 100% solid content were obtained. Took 80 g of the resin, mixed it well with 30 g of epoxy resin BP-501 (Chang-Chun Plastic Co., Ltd., Taiwan), 26.4 g of epoxy resin BP-188 (Chang-Chun Plastic Co., Ltd., Taiwan), 8 g of butanone, and 6 g of isopropanol, then added 8 g of 30% acetic acid aqueous solution, stirred until well mixed. Then added 182 g of deionized water while stirring continued. A light-blue colored aqueous dispersion having about 40% solid content was obtained. Applied the aqueous dispersion onto a flexible PVC sheet substrate to form a wet film of about 10 μm in thickness. Baked the coated substrate in 110° C. for one minute. After cooling, the sheet was able to be rolled up without sticking together. After placed in room temperature for a week, the dried film demonstrated very good water resistance, alcohol resistance and solvent resistance. After wiping with water and alcohol for 2000 times, the film remained undamaged, and no water spots or other marks were left. After wiping with toluene for 1000 times, the film remained undamaged.

EXAMPLE 4

In a 500 ml four neck reaction kettle, added 20 g of polyethylene glycol PEG-400, 100 g of polyethylene glycol PEG-1000, 9 g of 1,4-butanediol, 18 g of butyl acrylate, 30 g of Cardula E-10 glycidyl ester (Shell Chemical Co.). Applied dried air sweep into the reaction kettle, and stirred until all ingredients were well mixed, then added 65.3 g of toluene diisocyanate (TDI). Maintained the reaction temperature between 40° to 60° C. After about 3 hours, the NCO content was measured to be 4.3% by weight. At this time, continued the dried air sweep, added 29 g of 2-hydroxyethyl acrylate, and maintained the reaction temperature between 40° to 60° C. After about 2.5 hours, the NCO content was measured to be zero. At this time, added 32 g of dipropylene triamine. The temperature should automatically increase to about 70° C. After maintaining at the temperature for about half an hour, increased the reaction temperature to 90° C., held for 3 hours, then cooled to 40° C. Added 34 g of isopropanol, and cooled down. Resins of 90% solid content were obtained. Took 96 g of the resin, mixed it well with 25 g of epoxy resin BP-501 (Chang-Chun Plastic Co., Ltd., Taiwan), 28.2 g of epoxy resin BP-188 (Chang-Chun Plastic Co., Ltd., Taiwan), 10 g of butanone, 3.3 g of isopropanol. Then added 175 g of deionized water while stirring continued. An non-ionic aqueous dispersion having about 40% solid content was obtained. Applied the aqueous dispersion onto nylon fabric substrate to form a wet film of 10 μm in thickness, and baked the coated substrate in 110° C. for 15 minutes. After cooling, the dried film had very good water resistance, alcohol resistance and solvent resistance. After wiping with water and alcohol for 2000 times, the film remained undamaged. After wiping with toluene for 1000 times, the film remained undamaged.

What is claimed is:

1. A process for preparing polyurethane resin comprising:
    (1) in a reaction mixture containing less than 70% by weight of a reactive diluent, reacting a polyol with an excess amount of polyisocyanate to form —NCO terminated polyurethane prepolymer, in which the reactive diluent is a chemical compound, oligomer, polymer, or mixture of said compound, oligomer and polymer that possesses an unsaturated ethylenic functionality or epoxy functionality, and is not reactive with —NCO functionality at about 60° C. or lower but is reactive with amine functionality;
    (2) adding a hydroxyl alkyl acrylate or hydroxyl alkyl methacrylate monomer to react with the prepolymer obtained in step (1) such that an alkyl acrylate or alkyl methacrylate terminated polyurethane prepolymer is formed, in which the OH/-NCO equivalent ratio is between 0.5 to 10; and
    (3) adding a polyamine containing primary or secondary amines to the reaction mixture obtained in step (2) such that the NH/(unsaturated ethylenic and epoxy functionality) mole ratio is between 1.1 to 10.0, and reacting the polyamine with the reactive diluent and the urethane prepolymer at about 60° C. or higher to form amine-containing polyurethane.

2. A preparation process according to claim 1, in which the polyol is a composition comprising at least one polyol selected from the group consisting of polyether polyol, polyester polyol and low molecular weight diol or triol having a molecular weight less than 200.

3. A preparation process according to claim 2, in which the polyether polyol and polyester polyol have average molecular weights between 200 to 10,000.

4. A preparation process according to claim 2, in which the polyol comprises a sufficient amount of polyethylene glycol having an average molecular weight between 200 to 10,000 such that the polyurethane obtained by the process can be dispersed into water to form a non-ionic polyurethane aqueous dispersion.

5. A preparation process according to claim 2, in which the polyol comprises a sufficient amount of said diol or triol which has carboxylic acid group, sulfonic acid group, or their salts, or other anion forming functionality such that the polyurethane obtained by the process can be dispersed into water to form an anionic polyurethane aqueous dispersion.

6. A preparation process according to claim 1, in which the polyurethane obtained by the process, after being treated with an inorganic acid, organic acid or alkylating agent to form salt, can be dispersed into water to form a cationic polyurethane aqueous dispersion.

7. A preparation process according to claim 1, in which the reactive diluent in step (1) is acrylate, methacrylate or acrylonitrile monomer.

8. A preparation process according to claim 1, in which the reactive diluent in step (1) is epoxy containing compound, oligomer or polymer.

9. A preparation process according to claim 1, in which the reactive diluents in step (1) are mixtures comprising acrylate, methacrylate and epoxy containing monomers.

10. A preparation process according to claim 1, in which the reaction temperature of step (2) is between room temperature to 60° C.

11. A preparation process according to claim 1, in which the polyamine in step (3) is alkyl polyamine compound, oligomer, or their condensation product with other monomer to form polyamine having polyether, polyester, polyamide or polypropionic acid as main chain.

12. A preparation process according to claim 11, in which the polyamine is alkyl diamines or triamines.

13. A process for preparing a crosslinkable polyurethane aqueous dispersion comprising:
(1) in a reaction mixture containing less than 70% by weight of a reactive diluent, reacting a polyol with an excess amount of polyisocyanate to form —NCO terminated polyurethane prepolymer, in which the reactive diluent is a chemical compound, oligomer, polymer, or mixture of said compound, oligomer and polymer that possesses an unsaturated ethylenic functionality or epoxy functionality, and is not reactive with —NCO functionality at about 60° C. or lower but is reactive with amine functionality;
(2) adding a hydroxyl alkyl acrylate or hydroxyl alkyl methacrylate monomer to react with the prepolymer obtained in step (1) such that an alkyl acrylate or alkyl methacrylate terminated polyurethane prepanolymer is formed, in which the OH/-NCO equivalent ratio is between 0.5 to 10;
(3) adding a polyamine containing primary or secondary amines to the reaction mixture obtained in step (2) such that the NH/(unsaturated ethylenic and epoxy functionality) mole ratio is between 1.1 to 10.0, and reacting the polyamine with the reactive diluent and the urethane prepolymer at about 60° C. or higher to form amine-containing polyurethane; and
(4) mixing the amine-containing polyurethane obtained in step (3) with a stoichiometric amount of a crosslinking agent, and by generating ionic salt in the polyurethane, the mixture being dispersed into water to form an anionic or cationic, crosslinkable polyurethane aqueous dispersion; or by utilizing an appropriate amount of polyethylene glycol polyol as the polyol in step (1), the mixture being dispersed into water to form a non-ionic, crosslinkable polyurethane aqueous dispersion.

14. A preparation process according to claim 13, in which the crosslinking agent is a chemical compound, oligomer or polymer containing two or more epoxy functionalities.

15. A preparation process according to claim 13, in which the crosslinking agent is a chemical compound, oligomer or polymer containing two or more blocked isocyanates.

16. A preparation process according to claim 13, in which the polyol comprises a sufficient amount of polyethylene glycol having an average molecular weight between 200 to 10,000 such that the polyurethane obtained is dispersed into water to form a non-ionic polyurethane aqueous dispersion.

17. A preparation process according to claim 13, in which the polyol comprises a sufficient amount of diol or triol which has a molecular weight less than 200 and has carboxylic acid group, sulfonic acid group, or their salts, or other anion forming functionality such that the polyurethane is dispersed into water to form an anionic polyurethane aqueous dispersion.

18. A preparation process according to claim 13, in which the polyurethane obtained in step (3) after being treated with an inorganic acid, organic acid or alkylating agent to form salt, is dispersed into water to form a cationic polyurethane aqueous dispersion.

19. A preparation process according to claim 13, in which the reactive diluent used in the step (1) is 5–25%, based on the weight of the reaction mixture.

20. A process for preparing polyurethane resin comprising:
(1) in a reaction mixture containing 5–25% by weight of a reactive diluent, reacting a polyol with an excess amount of polyisocyanate to form —NCO terminated polyurethane prepolymer, in which the reactive diluent is a chemical compound, oligomer, polymer, or mixture of said compound, oligomer and polymer that possesses an unsaturated ethylenic functionality or epoxy functionality, and is not reactive with —NCO functionality at about 60° C. or lower but is reactive with amine functionality;
(2) adding a hydroxyl alkyl acrylate or hydroxyl alkyl methacrylate monomer to react with the prepolymer obtained in step (1) such that an alkyl acrylate or alkyl methacrylate terminated polyurethane prepolymer is formed, in which the OH/-NCO equivalent ratio is between 0.5 to 10; and
(3) adding a polyamine containing primary or secondary amines to the reaction mixture obtained in step (2) such that the NH/(unsaturated ethylenic and epoxy functionality) mole ratio is between 1.1 to 10.0, and reacting the polyamine with the reactive diluent and the urethane prepolymer at about 60° C. or higher to form amine-containing polyurethane.

* * * * *